United States Patent
Thompson

(10) Patent No.: US 9,896,187 B2
(45) Date of Patent: Feb. 20, 2018

(54) CONNECTOR BETWEEN TWO AIRCRAFT COMPONENTS, SUCH AS A WING AND WING TIP DEVICE

(71) Applicant: AIRBUS OPERATIONS LIMITED, Bristol (GB)

(72) Inventor: Robert Ian Thompson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 176 days.

(21) Appl. No.: 15/072,401

(22) Filed: Mar. 17, 2016

(65) Prior Publication Data

US 2016/0272298 A1  Sep. 22, 2016

(30) Foreign Application Priority Data

Mar. 17, 2015 (GB) .................................. 1504468.8

(51) Int. Cl.
*B64C 3/38* (2006.01)
*B64C 3/56* (2006.01)

(52) U.S. Cl.
CPC . *B64C 3/38* (2013.01); *B64C 3/56* (2013.01)

(58) Field of Classification Search
CPC .................................... B64C 3/38; B64C 3/56
USPC ......... 244/199.4, 124, 35 A, 35 R, 45 R, 91, 244/199.3, 198, 201
See application file for complete search history.

(56) References Cited

U.S. PATENT DOCUMENTS

| | | | |
|---|---|---|---|
| 2,468,425 A * | 4/1949 | Carpenter ................. | B64C 3/56 244/49 |
| 3,273,833 A | 9/1966 | Windecker | |
| 4,776,542 A * | 10/1988 | Van Dam ................... | B64C 3/10 244/198 |
| 5,201,479 A * | 4/1993 | Renzelmann ............. | B64C 3/56 244/49 |
| 5,350,135 A * | 9/1994 | Renzelmann ............. | B64C 3/56 244/49 |
| 9,499,252 B2 * | 11/2016 | Lassen ....................... | B64C 3/56 |
| 2007/0018049 A1 * | 1/2007 | Stuhr ........................ | B64C 23/069 244/124 |
| 2012/0228424 A1 | 9/2012 | Parker | |

(Continued)

FOREIGN PATENT DOCUMENTS

| | | |
|---|---|---|
| WO | 2011051699 A2 | 5/2011 |
| WO | 2012131335 A2 | 10/2012 |

OTHER PUBLICATIONS

Search Report issued in Great Britain Application No. 15039803 dated Sep. 11, 2015.

(Continued)

*Primary Examiner* — Justin M Benedik
(74) *Attorney, Agent, or Firm* — Hauptman Ham, LLP

(57) ABSTRACT

An aircraft structure comprising a wing tip device connected to a wing by a plurality of connectors, wherein each connector comprises a spigot associated with the wing tip device or the wing, and a lug associated with the other of the wing tip device or wing. The lug has a hole for receiving the respective spigot. The spigot of each connector is moveably mounted, relative to said wing tip device or wing, about a central position, such that during movement of the connectors from a dis-engaged configuration to an engaged configuration, each spigot can move away from the central position to align itself with the hole of the respective lug.

23 Claims, 8 Drawing Sheets

(56) References Cited

U.S. PATENT DOCUMENTS

| | | |
|---|---|---|
| 2013/0199018 A1 | 8/2013 | Maier et al. |
| 2013/0292508 A1 | 11/2013 | Fox |
| 2014/0008493 A1 | 1/2014 | Whitlock et al. |
| 2014/0061371 A1* | 3/2014 | Good ................. B64C 3/56 244/49 |
| 2014/0117150 A1* | 5/2014 | Good ................. B64C 3/56 244/49 |
| 2014/0117151 A1* | 5/2014 | Fox ................... B64C 3/56 244/49 |

OTHER PUBLICATIONS

Search Report issued in Great Britain Application No. 1504468.8 dated Sep. 22, 2015.
European Search Report dated Jul. 14, 2016 EP Application No. 16160524.

* cited by examiner

CONNECTOR BETWEEN TWO AIRCRAFT COMPONENTS, SUCH AS A WING AND WING TIP DEVICE

RELATED APPLICATIONS

The present application claims priority from Great Britain Application Number 1504468.8, filed Mar. 17, 2015, the disclosure of which is hereby incorporated by reference herein in its entirety.

BACKGROUND OF THE INVENTION

The present invention relates to connectors between first and second aircraft components (for example a wing and wing tip device), and more specifically to connectors comprising a spigot and a lug, the lug having a hole for receiving the respective spigot in a male/female connection. The present disclosure also relates to an aircraft structure comprising a first structure connected to a second structure by the plurality of connectors, and a method of connecting the two structures.

There is a trend towards increasingly large passenger aircraft, for which it is desirable to have correspondingly large wing spans. However, the maximum aircraft span is effectively limited by airport operating rules which govern various clearances required when manoeuvring around the airport (such as the span and/or ground clearance required for gate entry and safe taxiway usage).

In some suggested designs, aircraft are provided with wing tip devices which may be folded to reduce the span of the aircraft on the ground (compared to when the aircraft is configured for flight). The wing tip devices may, for example, be configurable between: (i) a flight configuration for use during flight and (ii) a ground configuration for use during ground-based operations, in which ground configuration the wing tip device is moved away from the flight configuration such that the span of the aircraft is reduced.

UK patent application number GB1503980.3 filed on 9 Mar. 2015 with agent's reference P023010GB/JMF describes a previously-suggested arrangement in which an aircraft comprises a wing and a wing tip device, the wing tip device being moveable relative to the wing between: a flight configuration for use during flight, an intermediate configuration, and a ground configuration for use during ground-based operations. In the flight configuration the wing and wing tip device are locked together via a multiplicity of connectors. In the intermediate configuration the wing tip device is displaced forwards in a chordwise direction, relative to the wing, the displacement being such that the connection by the multiplicity of connectors is disengaged and being such that the wing tip device is unlocked from the wing. In the intermediate configuration the wing tip device is also connected to the wing via a hinge about which the wing tip device may rotate. In the ground configuration, the wing tip device is rotated about the hinge, such that the span of the aircraft is reduced.

The connectors described in UK patent application number GB1503980.3 each comprise a spigot and lug, the lug having a hole for receiving the respective spigot in a male/female connection. When the wing tip device is moved in a chordwise direction, the spigots move into/out of the hole of the respective lug, such that the connectors move to an engaged/disengaged configuration.

It has been identified that in the above-described arrangement, each spigot may not necessarily line up with the hole of its respective lug. This may, for example, be due to factors such as tolerances, deflections, wear effects, and/or temperature changes.

One suggestion for overcoming this problem is to deliberately make the diameter of each spigot smaller than the hole of the respective lug. Such an arrangement is better able to cope with misalignment. However, it also results in a relatively loose fit between the spigot and the lug. A loose fit is undesirable because it could lead to fretting and wear under flight conditions, which often result in the wing/wing tip device vibrating and/or flexing.

The present invention seeks to mitigate at least some of the above-mentioned problems, particularly relating to misalignment and/or fretting and wear.

SUMMARY OF THE INVENTION

According to a first aspect of the invention, there is provided an aircraft structure comprising a wing tip device connected to a wing tip by a plurality of connectors, wherein each connector comprises a spigot associated with the wing tip device or the wing, and a lug associated with the other of the wing tip device or wing, the lug having a hole for receiving the respective spigot in a male/female connection, wherein the connectors are configurable between an engaged configuration in which each spigot is received in the hole of the respective lug, thereby connecting the wing and wing tip device together, and a dis-engaged configuration in which each spigot is withdrawn from the hole of the respective lug such that the wing tip device is moveable relative to the wing, characterised in that the spigot of each connector is moveably mounted, relative to said wing tip device or wing, about a central position, such that during movement of the connectors from the dis-engaged configuration to the engaged configuration, each spigot can move away from the central position to align itself with the hole of the respective lug.

By providing a spigot that is moveably mounted, relative to the first component, each spigot can move away from the central position to align itself with the hole of the respective lug. This enables the spigots to engage their respective holes even if they are not (initially) precisely aligned with those holes. There is therefore a reduced need to make the spigots significantly smaller the hole (as might otherwise be required to cope with misalignment). Indeed, in preferred embodiments of the invention the diameter of the spigot is substantially equal to the inner diameter of the hole such that the spigot may be received in a tight fit.

Each spigot is moveably mounted. For example, each spigot may be on a floating connection. Each spigot may be moveable, about the central position, in a plane that is perpendicular to the longitudinal axis of the spigot. Each spigot may be moveable in all directions that are perpendicular to the longitudinal axis of the spigot. The lug of each connector is preferably fixed relative to said wing or wing tip device.

Each spigot is moveable to cope with misalignment between the spigot and hole. Thus, each spigot need not necessarily be moveable by a large distance. For example, each spigot may be moveable, about the central position, by a distance that is less than the diameter of the spigot.

Each spigot may comprise a distal end for initial entry into the hole of the respective lug. Said distal end is preferably tapered to assist movement of the distal end into the hole. Alternatively or additionally, the entrance of the hole may be tapered to assist movement of the distal end of the spigot into the hole. The taper may be in a number of forms. For example, the taper may be in the form of a chamfer. The taper may be in the form of a curved profile (such as a radius or elliptical rounding profile).

Each connector may comprise a re-centering mechanism for re-centering the spigot to its central position. The connector may be configurable from the engaged configuration, to a locked-engaged configuration, in which locked-engaged configuration each spigot has been re-centred to its central position by the re-centering mechanism. Providing an arrangement in which the spigots can be re-centered after they have been engaged, tends to enable the relative positions of the wing and wing tip device to be altered, and preferably improved, after they have been connected.

The connectors may be moved from the engaged configuration into the locked-engaged configuration by relative movement of the wing and the wing tip device towards each other. The movement is preferably in a direction parallel to the longitudinal axes of the spigots and the holes. Providing an arrangement in which this movement moves the connectors into the locked-engaged position has been found to be especially beneficial, because it provides a simple way of re-centering the spigots. For example an actuator may be arranged to move the wing and wing tip device towards each other, thereby effecting the re-centering of the spigots.

The re-centering mechanism may comprise a male member and a female member for receiving the male member. At least one of the male or female members may have a tapered surface for urging the male and female members into a concentric relationship as the male member moves into the female member, thereby re-centering the spigot. Providing such an arrangement is beneficial because once re-centred, the male and female members tend to resist movement of the spigot away from the central position (is resist movement perpendicular to the axis of the spigot). This is especially the case if the male and female members are biased into, or held in, the re-centred position. The connector may therefore be more effectively 'locked' thereby reducing the possibility of fretting and wear.

The connectors are preferably biased into the locked-engaged configuration

The male and female members may have complementary surfaces for urging the male and female members into a concentric relationship as the male members move into the female member. The male member may comprise a truncated cone. The male member may be in the form of a truncated cone. The female member may comprise a chamfered hole.

Each spigot may be mounted on said wing tip device or wing, via the re-centering mechanism.

Embodiments of the present invention are especially applicable arrangements in which the wing tip device is moveable relative to the wing between: a flight configuration for use during flight, and a ground configuration for use during ground-based operations, in which ground configuration the wing tip device is moved away from the flight configuration such that the span of the aircraft is reduced. The wing tip device may be moveable from the flight configuration to the ground configuration via an intermediate configuration. During movement from the flight configuration to the intermediate configuration the wing tip device may be displaced in a first direction, relative to the wing, the displacement being such the connectors move from the engaged configuration to the dis-engaged configuration.

The first direction is preferably substantially parallel to the longitudinal axes of the spigots. The first direction may be forwards, in a generally chordwise direction.

In the intermediate configuration the wing tip device is preferably connected to the wing via a hinge about which the wing tip device region may rotate. In the ground configuration, the wing tip device is preferably rotated about the hinge, such that the span of the aerodynamic structure is reduced. The movement in the first direction may be parallel to the axis of the hinge. The hinge is preferably arranged to accommodate movement of the wing tip device, in the first direction, along the hinge axis.

In preferred embodiments of the invention, the spigots of each connector are associated with the wing. The lugs of each connector may be associated with the wing tip device.

The wing tip device may be connected to the wing by a multiplicity of connectors.

In preferred embodiments of the invention the wing tip device may be a wing tip extension; for example the wing tip device may be a planar tip extension. In other embodiments, the wing tip device may comprise, or consist of, anon-planar device, such as a winglet. In the flight configuration the trailing edge of the wing tip device is preferably a continuation of the trailing edge of the wing. The leading edge of the wing tip device is preferably a continuation of the leading edge of the wing. There is preferably a smooth transition from the wing to the wing tip device. It will be appreciated that there may be a smooth transition, even where there are changes in sweep or twist at the junction between the wing and wing tip device. However, there are preferably no discontinuities at the junction between the wing and wing tip device. The upper and the lower surfaces of the wing tip device may be continuations of the upper and lower surfaces of the wing.

When the wing tip device is in the ground configuration, the aircraft may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

According to another aspect of the invention there is provided an aircraft comprising the aircraft structure described herein. The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

According to another aspect of the invention, there is provided a connector for use as one of the connectors as described herein. The connector comprises a spigot and a lug, the lug has a hole for receiving the spigot in a male/female connection, wherein the connector is configurable between an engaged configuration in which the spigot is received in the hole of the lug, and a dis-engaged configuration in which the spigot is withdrawn from the hole of the lug, characterised in that the spigot of the connector is moveably mountable, on a wing or wing tip device, about a central position, such that during movement of the connector from the dis-engaged configuration to the engaged configuration, the spigot can move away from the central position to align itself with the hole of the lug.

According to another aspect of the invention, there is provided a method of connecting a wing tip device to a wing using a plurality of connectors, wherein each connector comprises a spigot associated with the wing tip device or wing, and a lug associated with the other of the wing tip device or wing, the lug having a hole for receiving the respective spigot in a male/female connection, the method comprising the steps of: moving from a dis-engaged configuration in which each spigot is withdrawn from the hole of the respective lug such that the wing tip device is moveable relative to the wing, to an engaged configuration which each spigot is received in the hole of the respective lug, thereby connecting the wing and wing tip device together, characterised in that the spigot of each connector is moveably mounted, relative to said wing tip device or wing, about a central position, and the method comprises the step of allowing the spigot to move away from the central position to align itself with the hole of the respective lug.

The method may further comprise the step of moving the connectors to a locked-engaged configuration. In the locked-engaged configuration each spigot has preferably been re-centred to its central position by a re-centering mechanism. The step of moving the connectors to the locked-engaged configuration may comprise effecting relative movement of the wing and the wing tip device towards each other, in a direction parallel to the longitudinal axes of the spigot and the hole.

In the above-mentioned aspects of the invention, the spigot is moveably mounted relative to the wing or wing tip device. In principle, at least some of the advantages of the invention may also be obtained in embodiments in which the lug is moveably mounted relative to the wing or wing tip device (and in which the spigot may be fixed, or may also be moveably mounted, relative to the respective wing or wing tip device). Thus, according to another aspect of the invention, there is provided an aircraft structure comprising a wing tip device connected to a wing tip by a plurality of connectors, wherein each connector comprises a spigot associated with the wing tip device or the wing, and a lug associated with the other of the wing tip device or wing, the lug having a hole for receiving the respective spigot in a male/female connection, wherein the connectors are configurable between an engaged configuration in which each spigot is received in the hole of the respective lug, thereby connecting the wing and wing tip device together, and a dis-engaged configuration in which each spigot is withdrawn from the hole of the respective lug such that the wing tip device is moveable relative to the wing, characterised in that the lug of each connector is moveably mounted, relative to said wing tip device or wing, about a central position, such that during movement of the connectors from the dis-engaged configuration to the engaged configuration, each lug can move away from the central position to align the hole of the lug, with the respective spigot.

According to yet another aspect of the invention, there is provided an aircraft structure comprising a first aircraft component connected to a second aircraft component by a plurality of connectors, wherein each connector comprises a spigot associated with the first or second aircraft component, and a lug associated with the other of the first or second aircraft component, the lug having a hole for receiving the respective spigot in a male/female connection, wherein the connectors are configurable between an engaged configuration in which each spigot is received in the hole of the respective lug, thereby connecting the components together, and a dis-engaged configuration in which each spigot is withdrawn from the hole of the respective lug such that the second component is moveable relative to the first component, characterised in that the spigot and/or lug of each connector is moveably mounted, relative to said respective first or second component, about a central position, such that during movement of the connectors from the dis-engaged configuration to the engaged configuration, each spigot and/or lug can move away from the central position to align itself with the hole of the respective lug and/or respective spigot. Features described herein with reference to a wing in the other aspects of the invention, may be equally applicable to the first aircraft component in this aspect of the invention. Features described herein with reference to a wing tip device may in the other aspects of the invention, may be equally applicable to the second component in this aspect of the invention.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
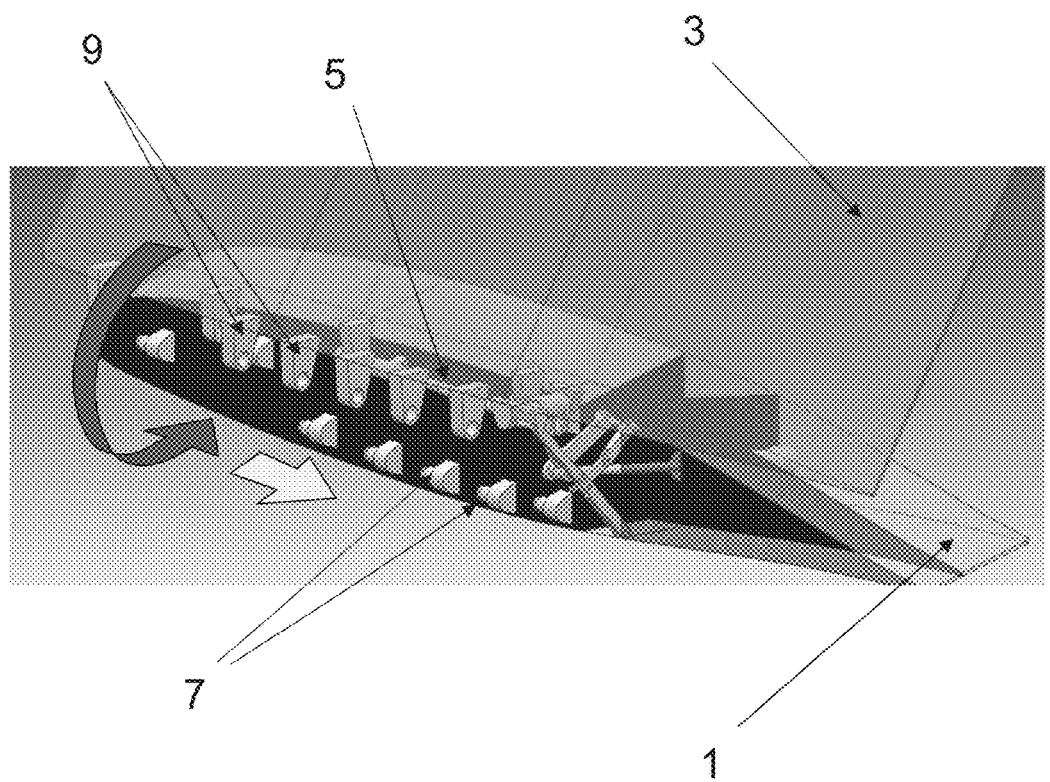
FIG. 1 shows a perspective view of a wing and wing tip device according to a first embodiment of the invention.

FIG. 1 shows a perspective view of a wing 1 and wing tip device 3 according to a first embodiment of the invention. The wing tip device 3 is a planar wing tip extension and is shown in a ground configuration in which the wing tip device 3 is rotated upwardly (about the hinge 5) to reduce the span of the wing 1. It will be appreciated that for the sake of clarity, the wing tip device 3 is shown in phantom and only the outer part of the wing 1 is shown.

The wing tip device 3 is downwardly rotatable about the hinge 5 (in a direction shown by the large curved arrow in FIG. 1), to an intermediate configuration in which six spigots 7 associated with the wing 1 are aligned with the holes of six corresponding lugs 9 on the wing tip device 3. The wing tip device 3 is subsequently moveable in a chordwise direction (in a direction shown by the large straight arrow in FIG. 1), such that each spigot 7 engages the hole in the respective lug 9. Once the spigots 7 and lugs 9 are engaged, the wing tip device 3 is in a flight configuration; it is unable to rotate upwardly about the hinge 5 and is locked in position. Each spigot 7 and lug 9 combination, forms a connector 10.

This type of an arrangement per se is described in UK patent application number GB1503980.3 filed on 9 Mar. 2015 with agent's reference P023010 GB/JMF, which also describes an actuation mechanism for moving the wing tip device. The contents of that application are fully incorporated herein by reference. The claims of the present application may incorporate any of the features disclosed in that patent application. In the arrangement described in UK patent application number GB1503980.3 factors such as tolerances, deflections, wear effects, and/or temperature changes, may mean that each spigot does not necessarily line up with the hole of its respective lug.

Figure 2:
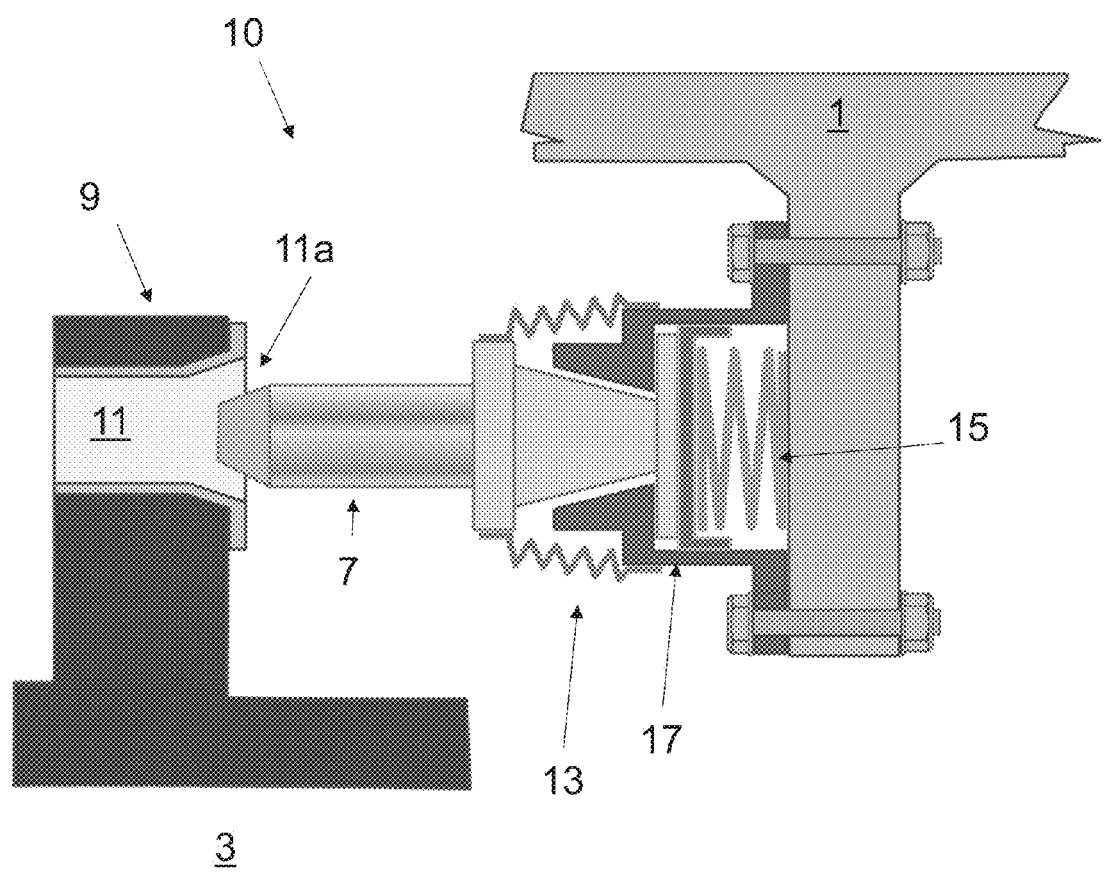
FIG. 2 shows a schematic view of one of the connectors in the structure of FIG. 1, the connector being in a dis-engaged configuration.

One suggestion for overcoming this problem is to deliberately make the diameter of each spigot smaller than the hole of the respective lug. Such an arrangement is better able to cope with misalignment. However, it may also result in a relatively loose fit between the spigot and the lug. A loose fit is undesirable because it could lead to fretting and wear under flight conditions in which the wing/wing tip device may vibrate and/or flex. The embodiment described herein seeks to mitigate these problems, as will now be explained with reference to FIGS. 2 to 8:

FIG. 2 is a close-up schematic view of one of the connectors 10 in FIG. 1, once the wing tip device 3 has been rotated about the hinge 5 into the intermediate configuration. The lug 9 is fixedly attached to the wing tip device 3. The lug 9 includes a hole 11 passing at the way through the lug 9. The hole has a chamfered entrance 11a for assisting entry of the spigot 7 into the hole 11.

The spigot 7 is moveably mounted on the wing 1 via a re-centering mechanism 13 (described in more detail below) and a floating connection 17 (also described in more detail below). The spigot 7 is resiliently biased in a direction away from the wing 1 by a pre-loading spring 15. The spigot 7 is initially positioned in a central position (shown in FIG. 2) in which it is centrally (concentrically) located in the re-centering mechanism 13.

Figure 3:
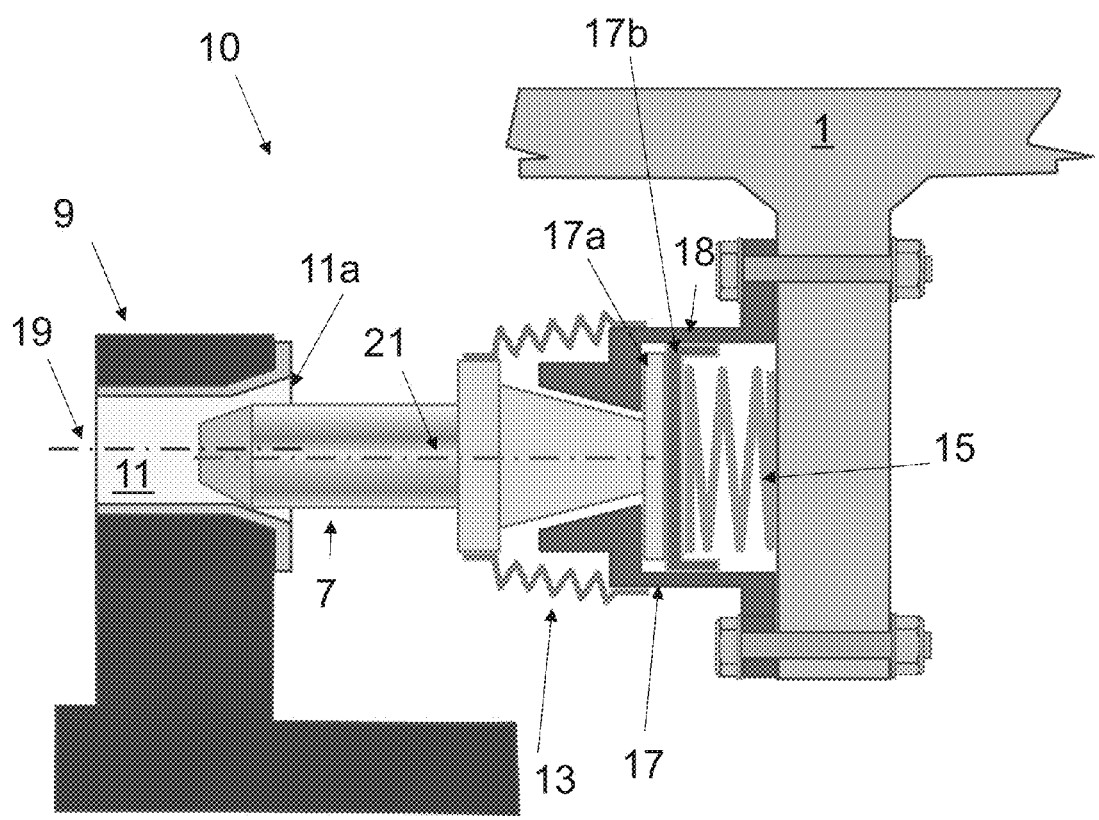
FIGS. 3 to 5 show the connector of FIG. 2 moving from the dis-engaged configuration into the engaged configuration.
Figure 4:
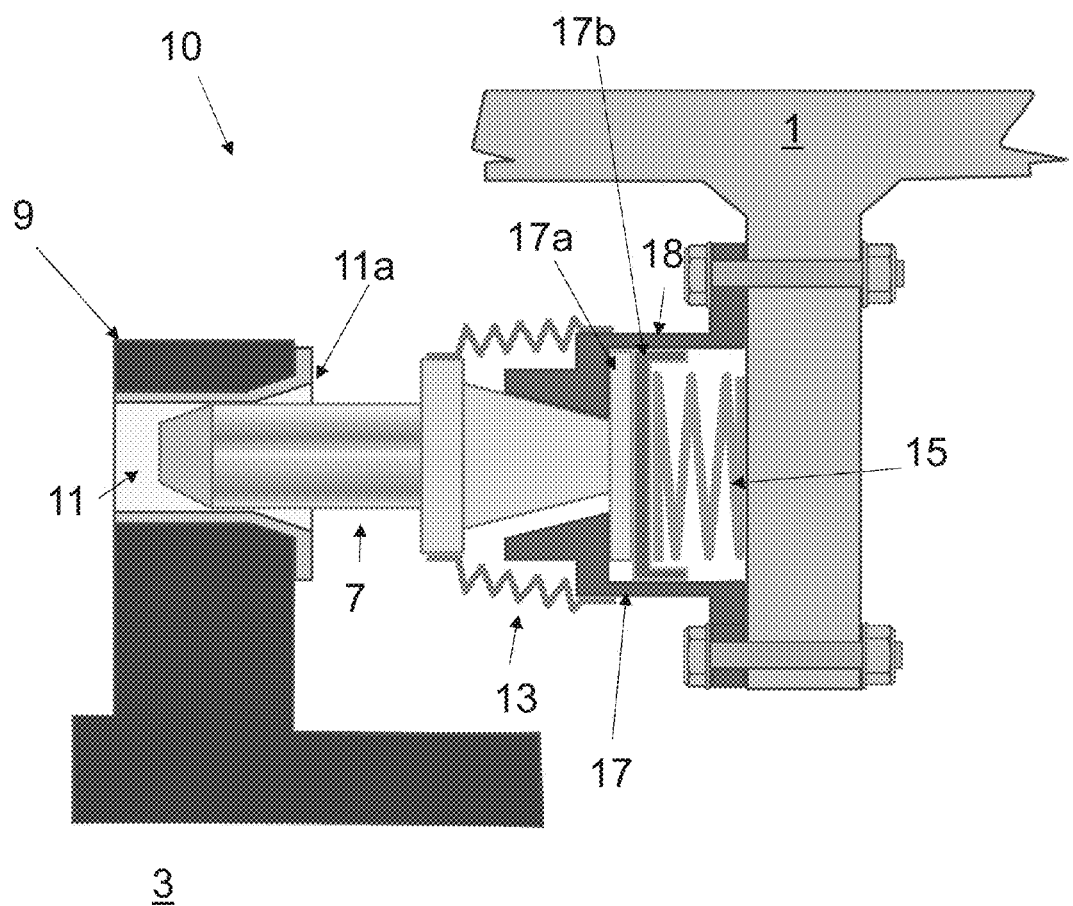

FIG. 3 shows the connector as the wing tip device 3 starts to be moved towards the wing 1 in a chordwise direction (which is also parallel to the longitudinal axes of the spigots 7). As shown in FIG. 3 the axis 19 of the hole 11 is initially not aligned with the axis 21 of the spigot 7. However, as the movement continues (see FIGS. 4 and 5), the spigot 7 enters the hole, and the chamfered entrance 11a acts to push the spigot 7 upwards, away from its central position, until it is aligned with the axis 19 of the hole 11.

In the first embodiment of the invention, the spigot 7 is moveably mounted on the wing 1, via a floating mounting 17, such that is can move relative to the wing 1. The floating mounting 17 comprises a first plate 17a associated with the spigot and a second plate 17b associated with the spring 15. The second plate 17b is biased against the first plate 17a by the spring 15. The interface between the two plates is lubricated such that the plates 17a, 17b can slide relative to each other. This allows movement of the spigot 7 in any direction within a plane that is perpendicular to the axis 21 of the spigot 7. The range of movement is radially confined by the housing 18 surrounding the floating mounting. Thus, the spigot 7 is able to become aligned with the hole 11, whilst the relative alignment of the wing 1 and wing tip device 3 remain unchanged. Such an arrangement enables the use of a spigot 7 with a diameter that is substantially equal to the inner diameter of the hole 11. The spigot 7 is therefore able to be received in the hole 11 in a tight fit. This minimises fretting and wear that might otherwise be caused if there were a looser fit between spigot 7 and hole 11.

Figure 5:
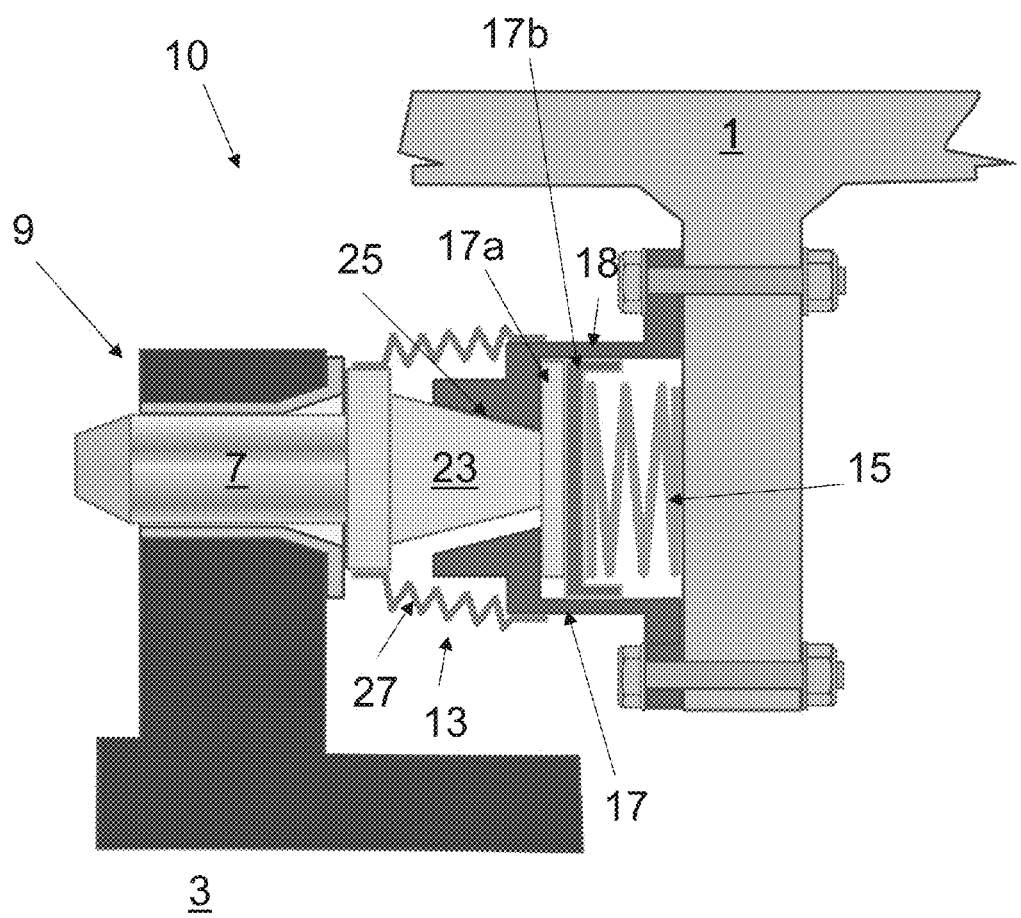

FIG. 5 shows the connector 10 in an engaged configuration in which the spigot 7 is received in the hole 11 to connect the wing 1 and wing tip device 3. However, in this configuration there is still the possibility of some wear and fretting due to the possibility of movement in the re-centering mechanism 13. The re-centering mechanism 13 comprises a male centering cone 23 received in a female chamfered hole 25, surrounded by a protective boot 27 to contain lubricant in the mechanism. Due to the earlier movement of the spigot (on the floating connection 17) away from the central position, the upper surface of the centering cone 23 is now abutting the upper-inner surface of the chamfer 25, but there is a gap between the lower surface of the cone 23 and the lower-inner surface of the chamfer 25. In other words, the male member 23 is no-longer concentric with the female member 25. This gap gives rise to the possibility of there still being undesirable movement within the connector 10.

Figure 6:
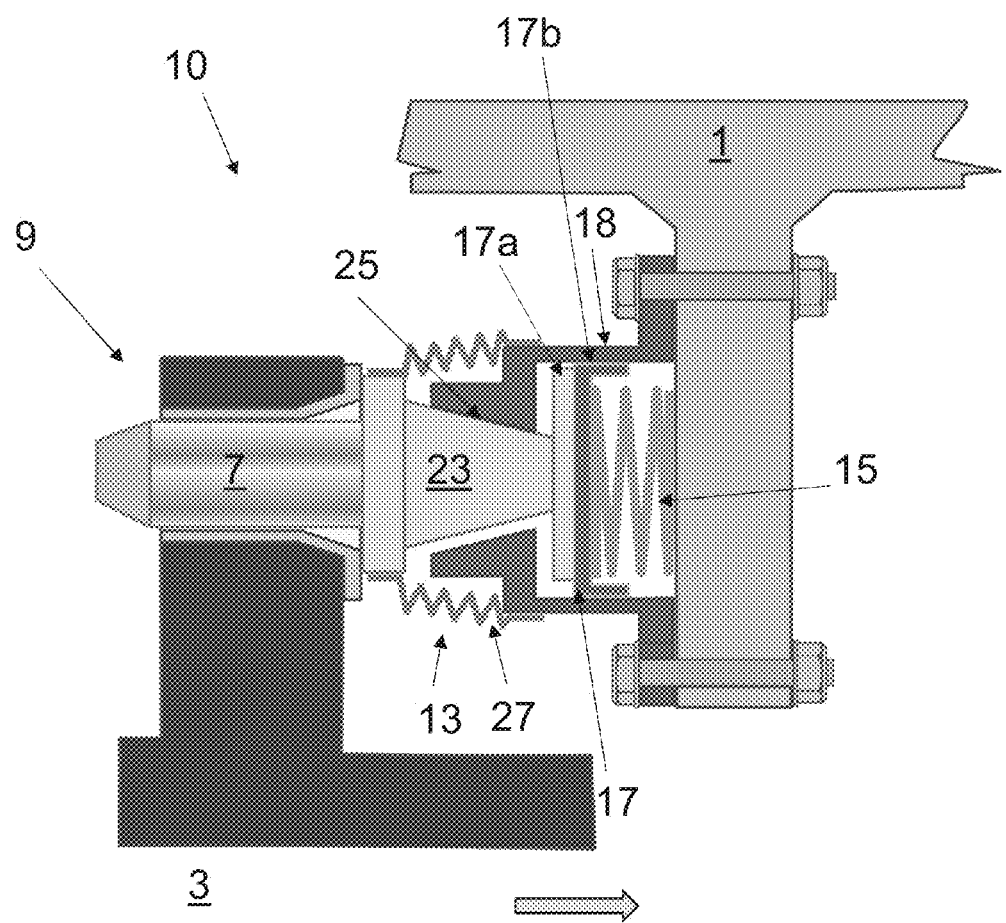
FIGS. 6 to 7 show the connector of FIG. 5 moving from the engaged configuration towards the locked-engaged configuration.
Figure 7:
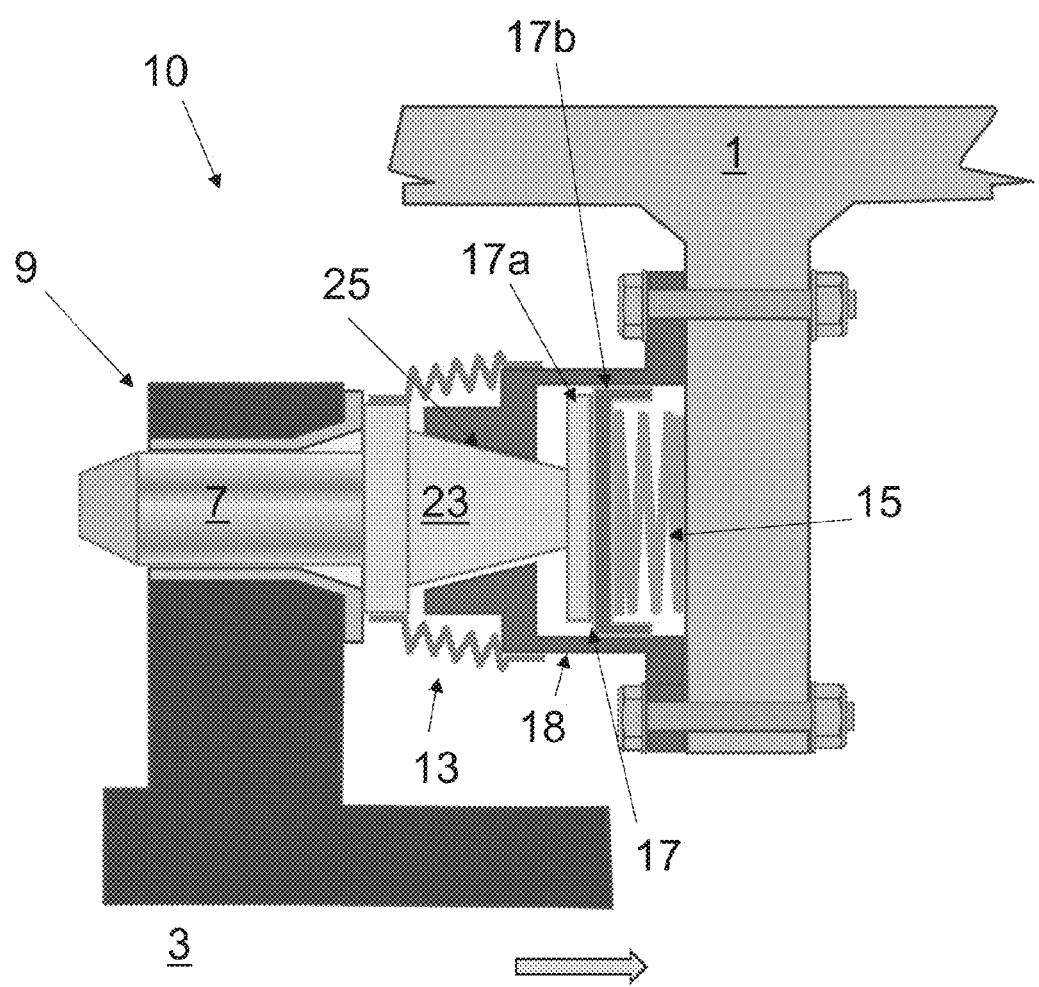
Figure 8:
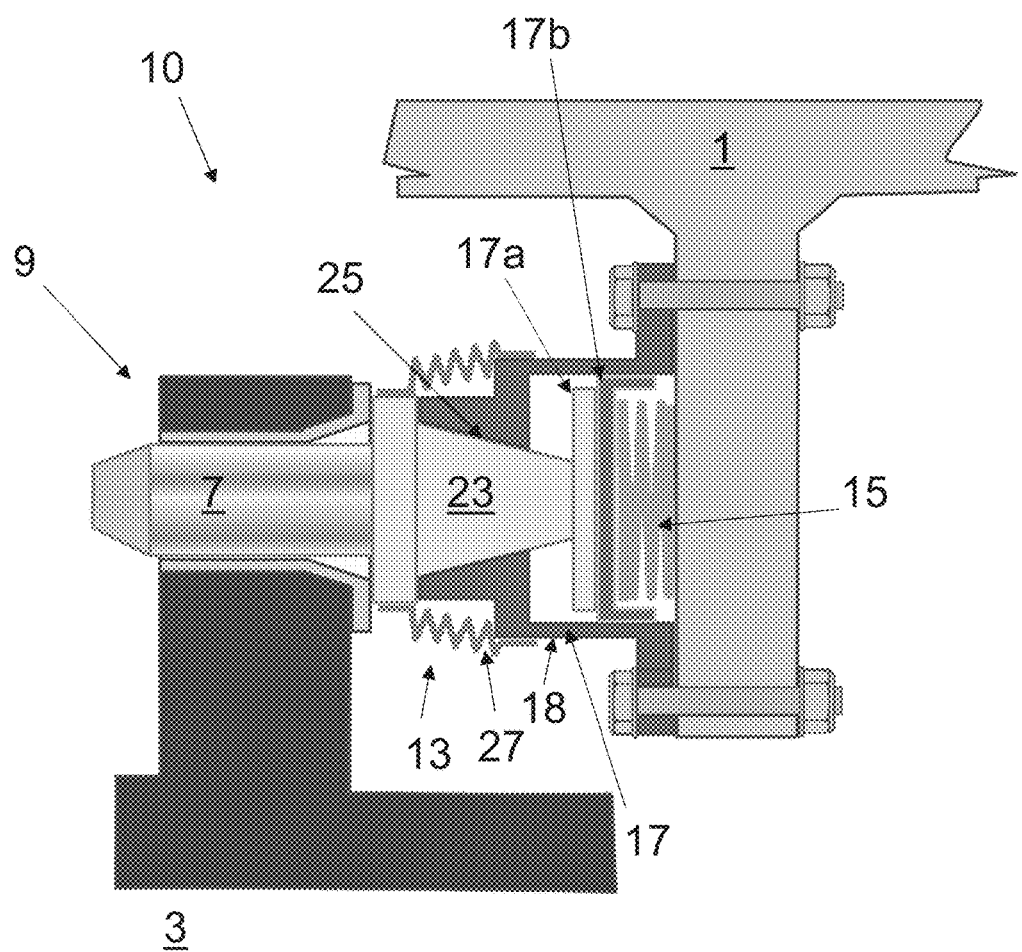
FIG. 8 shows the 3 shows the connector of FIG. 5 in the locked-engaged configuration.

FIGS. 6 to 7 show the connector of FIG. 5 moving from the engaged configuration towards a locked-engaged configuration in which the spigot is re-centered to the central position. This is effected by moving the wing tip device 3 towards the wing 1 in a direction parallel to the axis 21 of the spigot 7 (which is also parallel to the chordwise direction). As the wing tip device 3 is moved in this direction (see large arrow in FIG. 6), the centering cone 23 is moved in the female chamfered hole 25 and is urged back towards a concentric position. The longitudinal movement of the spigot 7 and wing tip device 3 is accommodated by compression of the spring 15.

Once the centering cone 23 is concentric with the hole 25 (see FIG. 8), all surfaces of the cone 23 are in contact with the chamfered surface. The structure of the connector 10 is therefore tightly fitted together and there is minimal scope for movement that might give rise to fretting or wear in the connector 10. The connector is therefore in a so-called locked-engaged configuration.

It will be appreciated that the first embodiment of the invention thus provides an arrangement that enables the spigots of multiple connectors to be aligned with their respective holes, and which may form a tightly locked connection.

Whilst the present invention has been described and illustrated with reference to a particular embodiment, it will be appreciated by those of ordinary skill in the art that the invention lends itself to many different variations not specifically illustrated herein. For example, in a further embodiment of the invention, the spigots may protrude from the tip of the wing in a spanwise direction and be received in corresponding lugs in the wing tip device. The spigots adopt the engaged and/or locked-engaged positions when the wing tip device is rotated downwards, to bring the lugs over the spigots.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft structure comprising a wing tip device connected to a wing tip by a plurality of connectors,
wherein each connector comprises a spigot associated with the wing tip device or the wing, and a lug associated with the other of the wing tip device or wing, the lug having a hole for receiving the respective spigot in a male/female connection,
wherein the connectors are configurable between an engaged configuration in which each spigot is received in the hole of the respective lug, thereby connecting the wing and wing tip device together, and a dis-engaged configuration in which each spigot is withdrawn from the hole of the respective lug such that the wing tip device is moveable relative to the wing,
wherein
the spigot of each connector is moveably mounted, relative to said wing tip device or wing, about a central position, such that during movement of the connectors from the dis-engaged configuration to the engaged configuration, each spigot can move away from the central position to align itself with the hole of the respective lug.

2. An aircraft structure according to claim 1, wherein the diameter of each spigot is substantially equal to the inner diameter of the hole of the respective lug, such that the spigot is a tight fit in the hole.

3. An aircraft structure according to claim 1, wherein each spigot is moveable, about the central position, in a plane that is perpendicular to the longitudinal axis of the spigot.

4. An aircraft structure according to claim 3, wherein each spigot is moveable, about the central position, by a distance that is less than the diameter of the spigot.

5. An aircraft structure according to claim 1, wherein each spigot comprises a distal end for initial entry into the hole of the respective lug, said distal end being chamfered to assist movement of the distal end into the hole.

6. An aircraft structure according to claim 1, wherein each connector comprises a re-centering mechanism for re-centering the spigot to its central position, and the connector is configurable from the engaged configuration, to a locked-engaged configuration, in which locked-engaged configuration each spigot has been re-centred to its central position by the re-centering mechanism.

7. An aircraft structure according to claim 6, wherein the connectors are moved from the engaged configuration into the locked-engaged configuration by relative movement of the wing and wing tip device towards each other, in a direction parallel to the longitudinal axes of the spigots and the holes.

8. An aircraft structure according to claim 7, wherein the re-centering mechanism comprises a male member and a female member for receiving the male member, at least one of the male or female members having a tapered surface for urging the male and female members into a concentric relationship as the male member moves into the female member, thereby re-centering the spigot.

9. An aircraft structure according to claim 8, wherein the male and female member have complementary surfaces for urging the male and female members into a concentric relationship as the male member moves into the female member.

10. An aircraft structure according to claim 8, wherein the male member comprises a truncated cone.

11. An aircraft structure according to claim 8, wherein the female member comprises a chamfered hole.

12. An aircraft structure according to claim 7, wherein each spigot is mounted on said wing tip device or wing, via the re-centering mechanism.

13. An aircraft structure according to claim 1 wherein the wing tip device is moveable relative to the wing between:
a) a flight configuration for use during flight, and
b) a ground configuration for use during ground-based operations, in which ground configuration the wing tip device is moved away from the flight configuration such that the span of the aircraft is reduced.

14. An aircraft structure according to claim 13, wherein the wing tip device is moveable from the flight configuration to the ground configuration via an intermediate configuration, and during movement from the flight configuration to the intermediate configuration the wing tip device is displaced in a first direction, relative to the wing, the displacement being such the connectors move from the engaged configuration to the dis-engaged configuration.

15. An aircraft structure according to claim 14, wherein the first direction is substantially parallel to the longitudinal axes of the spigots.

16. An aircraft structure according to claim 14, wherein the first direction is forwards, in a generally chordwise direction.

17. An aircraft structure according to claim 14, wherein in the intermediate configuration the wing tip device is connected to the wing via a hinge about which the wing tip device region may rotate, and in the ground configuration, the wing tip device is rotated about the hinge, such that the span of the aerodynamic structure is reduced.

18. An aircraft structure according to claim 1 wherein the spigots of each connector are associated with the wing, and the lugs of each connector are associated with the wing tip device.

19. A connector for use as one of the connectors in claim 1, the connector comprising a spigot and a lug, the lug having a hole for receiving the spigot in a male/female connection,
wherein the connector is configurable between an engaged configuration in which the spigot is received in the hole of the lug, and a dis-engaged configuration in which the spigot is withdrawn from the hole of the lug,
wherein
the spigot of the connector is moveably mountable, on a wing or wing tip device, about a central position, such that during movement of the connector from the dis-engaged configuration to the engaged configuration, the spigot can move away from the central position to align itself with the hole of the lug.

20. A method of connecting a wing tip device to a wing using a plurality of connectors,
wherein each connector comprises a spigot associated with the wing tip device or wing, and a lug associated with the other of the wing tip device or wing, the lug having a hole for receiving the respective spigot in a male/female connection,
the method comprising the steps of:
moving from a dis-engaged configuration in which each spigot is withdrawn from the hole of the respective lug such that the wing tip device is moveable relative to the wing, to an engaged configuration which each spigot is received in the hole of the respective lug, thereby connecting the wing and wing tip device together,
wherein
the spigot of each connector is moveably mounted, relative to said wing tip device or wing, about a central position, and the method comprises the step of allowing the spigot to move away from the central position to align itself with the hole of the respective lug.

21. A method according to claim 20, further comprising the step of moving the connectors to a locked-engaged configuration, in which locked-engaged configuration each spigot has been re-centred to its central position by a re-centering mechanism.

22. A method according to claim 21, wherein the step of moving the connectors to the locked-engaged configuration comprises moving the wing towards the wing tip device, in a direction parallel to the longitudinal axes of the spigot and the hole.

23. An aircraft structure comprising a wing tip device connected to a wing tip by a plurality of connectors,
wherein each connector comprises a spigot associated with the wing tip device or the wing, and a lug associated with the other of the wing tip device or wing, the lug having a hole for receiving the respective spigot in a male/female connection,
wherein the connectors are configurable between an engaged configuration in which each spigot is received in the hole of the respective lug, thereby connecting the wing and wing tip device together, and a dis-engaged configuration in which each spigot is withdrawn from the hole of the respective lug such that the wing tip device is moveable relative to the wing,
wherein
the lug of each connector is moveably mounted, relative to said wing tip device or wing, about a central position, such that during movement of the connectors from the dis-engaged configuration to the engaged configuration, each lug can move away from the central position to align the hole of the lug with the respective spigot.

* * * * *